US006880009B2

(12) United States Patent
Charas

(10) Patent No.: US 6,880,009 B2
(45) Date of Patent: Apr. 12, 2005

(54) METHOD AND APPARATUS IN A TELECOMMUNICATIONS SYSTEM

(75) Inventor: Phillippe Charas, Upplands Vasby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 769 days.

(21) Appl. No.: 09/760,569

(22) Filed: Jan. 15, 2001

(65) Prior Publication Data

US 2002/0056002 A1 May 9, 2002

(30) Foreign Application Priority Data

Jan. 15, 2000 (EP) .......................................... 00850007

(51) Int. Cl.$^7$ ........................................... G06F 15/173
(52) U.S. Cl. ..................... 709/226; 709/229; 370/389; 713/201
(58) Field of Search ................................ 709/223, 224, 709/226, 227, 229, 230; 370/389; 713/201

(56) References Cited

U.S. PATENT DOCUMENTS

| | | | | |
|---|---|---|---|---|
| 5,341,477 A | * | 8/1994 | Pitkin et al. ................ | 709/226 |
| 5,351,146 A | * | 9/1994 | Chan et al. .................... | 398/58 |
| 5,796,727 A | | 8/1998 | Harrison et al. ............ | 370/338 |
| 6,167,445 A | * | 12/2000 | Gai et al. .................... | 709/223 |
| 6,230,271 B1 | * | 5/2001 | Wadlow et al. ............. | 713/201 |
| 6,286,052 B1 | * | 9/2001 | McCloghrie et al. ....... | 709/238 |
| 6,502,131 B1 | * | 12/2002 | Vaid et al. ................... | 709/224 |
| 6,510,513 B1 | * | 1/2003 | Danieli ....................... | 713/156 |
| 6,587,876 B1 | * | 7/2003 | Mahon et al. .............. | 709/223 |
| 6,611,864 B2 | * | 8/2003 | Putzolu et al. .............. | 709/223 |
| 6,621,793 B2 | * | 9/2003 | Widegren et al. ........ | 370/230.1 |
| 6,678,835 B1 | * | 1/2004 | Shah et al. .................... | 714/4 |
| 6,714,987 B1 | * | 3/2004 | Amin et al. ................. | 709/249 |
| 2001/0032262 A1 | * | 10/2001 | Sundqvist et al. | |
| 2002/0069278 A1 | * | 6/2002 | Forslöw | |

FOREIGN PATENT DOCUMENTS

EP  0 852 448  1/1997
WO  WO 96/28947  9/1996

OTHER PUBLICATIONS

Elizabeth Clark, "Tweaking the bandwidth management barometer", Network Magazine, San Francisco: Dec. 1999, vol. 14, Issue 12, pp. 88–92.*

James Cimino, "SiteMinder 2.0", Network Solutions, Austin: May 1998, vol. 7, Issue 8, pp. 24–25.*

European Search Report, EP 00 85 0007, dated Jun. 16, 2000.

Petri Jokela, "Wireless Internet Access Using Anonymous Access Methods", XP–002140308, 1999 IEEE, International Workshop on Mobile Multimedia Communications, pp. 194–197.

Uchiyama, et al., "Network Functions and Signalling for Personal Roaming between Digital Cellular Standards", XP–002019703, Nov. 6–10, 1995, IEEE, International Conference on Universal Personal Communications, (pp. 447–451).

* cited by examiner

Primary Examiner—Anthony Knight
Assistant Examiner—Crystal J Barnes

(57) ABSTRACT

The present invention relates to methods for providing access independent global roaming between heterogeneous networks. The invention solves this problem and provides policy enforcement and service transparency when terminals roam between different heterogeneous networks. By providing a policy enforcement point associated with the terminal, and by concerning the transport mechanism between terminals and servers as a packet pipe, adding no extra value except transport and Quality of Service classification thereof. The payment for access and services can be separated and access may be paid in real-time by an anonymous payment method. In accordance with the invention, the terminal becomes more like a personal profile manager, managing rights to services and access. The ability to purchase access opens the possibility for the terminal to act as an e-commerce platform, and the subscriber can access any network any time since access is paid for in real time.

19 Claims, 8 Drawing Sheets

METHOD AND APPARATUS IN A TELECOMMUNICATIONS SYSTEM

TECHNICAL FIELD OF THE INVENTION

The present invention relates generally to a method for use in communications systems, and more particularly, the invention relates to a method of access independent global roaring. The invention further relates to a system and apparatus for carrying out the method.

BACKGROUND OF THE INVENTION

A large number of fixed and mobile access standards are now available, such as Wideband-Code Division Multiple Access (W-COMA), Universal Mobile Telephone System-Time Division Duplex (UMTS-TDD), CDMA 2000, Wireless-Local Area Network (W-LAN), EDGE etc, all of which belong to the $3^{rd}$ generation wireless standards. Each type of access standard has its own particular network concept; where Mobile Internet Protocol (Mobile IP) and the General Packet Radio Service (GPRS) tunnelling protocol are the main two concepts. The invention, however, is not limited to the above mentioned concepts.

Using methods presently available, interoperability between different network concepts is not guaranteed. This is mainly due to three obstacles. First, there is a lack of common subscriber profiles, service standards and authentication mechanisms, preventing enforcement of policies relating, but not limited to, access and service authorization, and accounting and mobility in different networks. Second, there is a lack of common Quality of Service (QoS) versus resource allocation paradigm in the access networks, due to a bottom up instead of a top down approach in designing the data link layers with respect to QoS requirements. Third, there is a lack of common higher layer standards in the terminals, preventing service transparency when user terminals, i.e. clients, roam between different networks that carry specific services.

Thus, there is a problem with interoperability between heterogeneous networks mainly because of problems with authentication and service transparency in and between different networks. It is, of course, theoretically possible to harmonise disparate networks at all of the above levels and thus creating interoperability. There is, however, a need for an organic way of integrating heterogeneous networks and thus providing access independent global roaming.

SUMMARY OF THE INVENTION

The present invention therefore provides a solution to the problems of integrating heterogeneous networks, providing for access independent global roaming and access to services via heterogeneous networks, without a need for harmonising disparate networks.

An object of the invention is to provide access independent global roaming in heterogeneous networks.

Another object of the invention is to provide policy enforcement and service transparency when terminals roam between different heterogeneous networks.

The invention achieves the above mentioned objects in embodiments thereof by:

moving at least essential or all service related functions out of the network into the periphery, i.e. clients or user terminals and servers, by separating service and access functions, conceiving the transport mechanism between clients or terminals and servers as a packet pipe, not necessarily adding extra value except transport and Quality of Service (QoS) classification thereof, separating the charging of transport from the charging of services and introducing real-time payment of transport, defining policies, basically a sot of rights and obligations, in a policy definition point, e.g. operator servers, enforcing policies in a policy enforcement point residing in the client, e.g. the user terminal, and standardising and modularising a client or terminal architecture that supports the above entities.

More specifically, the policies defined in the policy definition point are enforced locally in the user terminal in a local policy enforcement point instead of, as usual, in the network. By policies in this context is meant, among others, a set of rights and obligations pertaining to authentication of users, authorization to access and services as well as purchasing and brokering of transport resources and security, Accounting policies may govern the charging functions for access charging and service charging. By the separation of service and access functions, transport can be paid for separately, e.g. in real-time via a credit card, pre-paid card, cash card or the like and services can be paid for as usual e.g. as per invoice from a service provider, for example.

The client or terminal thus acts more as a personal profile manager, enforcing policies, hence managing rights to services and access. Services and access are controlled in the terminal by the local policy enforcement point and the terminal/profile manager is access independent, since access can be purchased in real-time. Thus, the subscriber can access any network at any time, considered the right modem or layer 1 and layer 2 access module is provided. Reference is made to the Open Systems Interconnect (OSI) model.

By adopting the proposed solution, as described in the embodiments of the invention, global roaming is possible between heterogeneous networks such as, CDMA 2000, W-LAN, EDGE and UMTS. The ability, with the present invention, to purchase access also opens the possibility for the terminal to act as an e-commerce platform; i.e. the terminal can be used to purchase anything, not just access.

The term transport used in this specification may identify an access network such as CDMA2000, W-CDMA etc. or e.g. both an access network and a core IP-network. The term access is used synonymous to the term transport.

Although the invention has been summarised above, the method and arrangement according to the appended independent claims define the scope of the invention. Various embodiments are further defined in the dependent claims.

BRIEF DESCRIPTION OF THE DRAWINGS

The objects and advantages of the invention will be understood by reading the following detailed description in conjunction with the drawings, in which.

DETAILED DESCRIPTION

Figure 1:
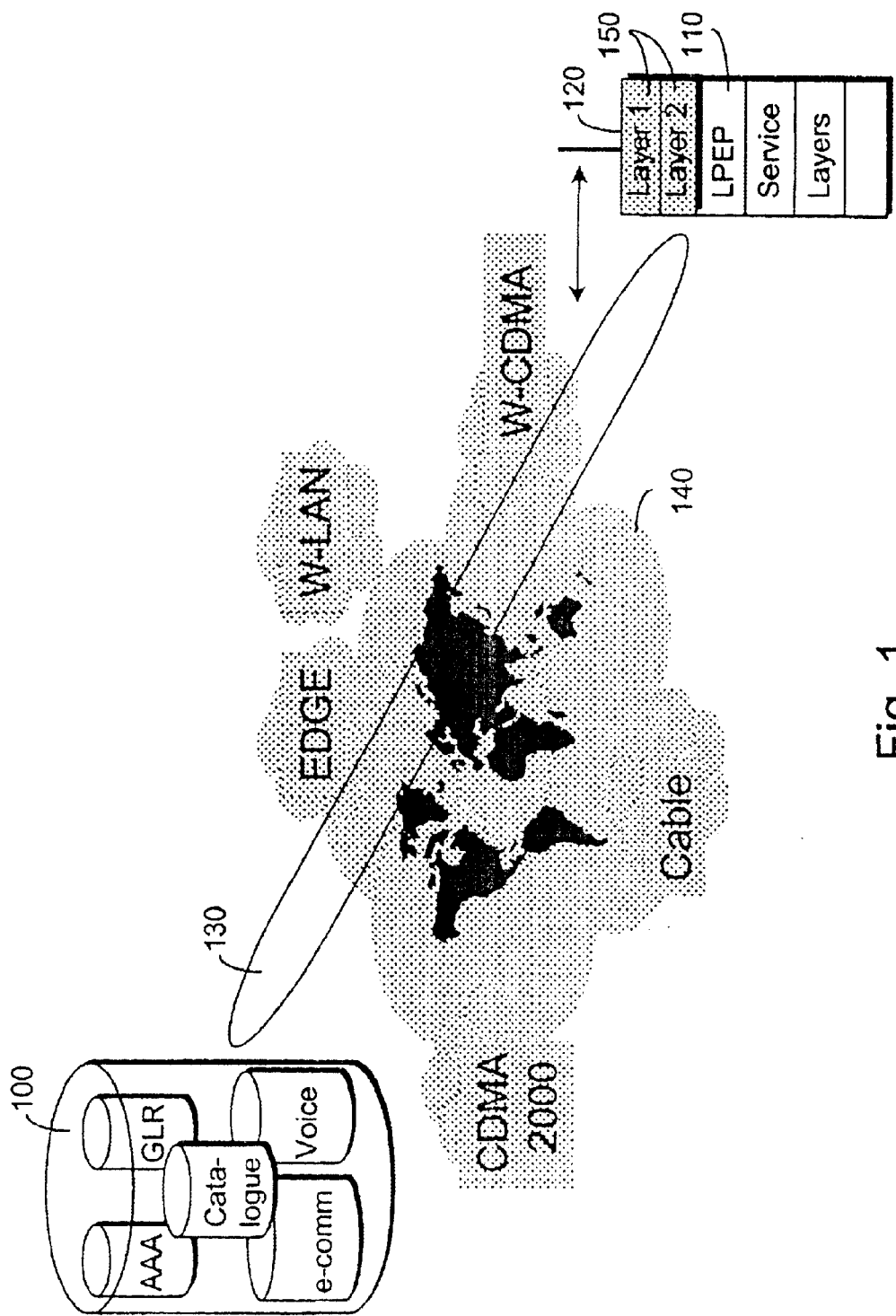
FIG. 1 shows a schematic picture of the architecture for global roaming in accordance with the present invention.

The various features of the invention will now be described with reference to the figures, in which like parts are identified with the same reference character. In the following description, for purpose of explanation and not limitation, specific details are set forth, such as particular circuits, components, techniques, etc. in order to provide a thorough understanding of the present invention. However, it will be apparent to one skilled in the art that the present invention may be practised in other embodiments that depart from these specific details. In other instances, detailed descriptions of well-known methods, devices and circuits are omitted so as not to obscure the description of the present invention.

The present invention describes a method of and a system for providing access independent global roaming between heterogeneous networks and solves the problem with policy enforcement and service transparency in and between different networks. The solution contains a number of salient features.

1) A client-server relationship.
2) A transparent "packet pipe", interconnecting servers and clients on a Quality of Service basis, transporting packets.
3) A Policy Definition Point (PDP) associated with or residing within a server or server cluster defining policies pertaining to services, authentication, authorization accounting, and
4) A Policy Enforcement Point (PEP), associated with or residing in the client, enforcing policies defined in the policy definition point, at the terminal (client).
5) Separate charging mechanisms for access and services, i.e. client-server based transactions.
6) A transformation of the access node into a point of sale for access, offering transparent IP transport.
7) Removable and interchangeable layer 1 and layer 2 access modules (modems) for the clients (terminals) for accessing different fixed and mobile standards.

The solution according to the invention will now be further described in more detail with references to FIGS. 1–7.

FIG. 1 shows a schematic picture of an architecture for global roaming according to the invention. The architecture can be divided into a service domain (non-shaded), and a transport domain 140 (shaded).

The service domain, which covers the higher layers, e.g. OSI-model, consists of a server cluster called Secure Mobile Portal (SMP) 100 and a client, governed by a Local Policy Enforcement Point (LPEP) 110 residing in the client or terminal 120. A secure encrypted packet transportation tunnel 130 connects the SMP 100 and the LPEP 110 in a Client-Server relationship. This tunnel is enabled by the establishment of shared secrets between the SMP 100 and the LPEP 110, contained in a policy, which is used to generate encryption keys for the packets, e.g. IP (Internet Protocol) packets. Since each IP packet is encrypted with a unique key, i.e. a shared secret between the service provider and the service buyer, each packet received by the SMP 100 will be seen as a de facto authentication of the service buyer or subscriber by the service provider.

The SMP 100 acts as a Policy Definition Point (PDP) for the LPEP 110 defining policies with respect to services, authentication of subscribers, authorization to access and services, accounting, mobility and security for the subscriber. The LPEP 110 residing in the client 120 enforces the policies defined in the SMP 100. A feature of the architecture is that charging for transport and services can be separated. Transport can be paid for in real-time using, for example, a pre-paid card, credit card, a cash card or the like. Transactions in the service domain can be paid for as usual e.g. as per invoice, for example.

The transport domain, consisting of an IP based core network 140 and IP based access networks such as designated by the acronyms CDMA 2000-, EDGE-, W-LAN-, W-CDMA- or fixed or cable networks, transports packets from the SMP 100 to the LPEP 110. The layer 1 and layer 2 part 150 of the client or terminal 120 also belongs to the transport domain and is preferably implemented as interchangeable modules (modems) for different access standards such as W-CDMA, EDGE, CDMA 2000, W-LAN etc. The transport domain not necessarily adds value to the packets, except that it classifies the packets according to Quality of Service and transports the packets to the end destination, guaranteeing access to physical resources where this is appropriate.

The different access networks in the transport domain must have the appropriate interfaces and support agreed on Quality of Service definitions, a so-called packet pipe 130. The packet pipe 130 provides layer 1 and layer 2 functions to convey packet data traffic across radio air interfaces, for example. As part of the transport domain, the access networks must also be able to process charging information in the embodiment of the invention wherein transport charging is independent of service charging. That is, wherein access charging is independent from any other charging, and is seen as a separate entity. The transport domain thus involves means for charging a subscriber for transport used, e.g. via a pre-paid card, credit card, cash card or other means. It is not necessary that a subscriber is authenticated or authorised by a service provider before transport charging takes place. It is only necessary to validate the pre-paid card, credit card, cash card or the like, i.e. it is possible to implement anonymous payment methods for transport. Access providers can accept different types of payment methods for payment of transport; e.g. some access providers may accept all major credit cards and their own special cash card for paying for access to their networks. This can be compared to when stores have a sticker on the entrance informing what credit cards they accept, for example.

Figure 2:
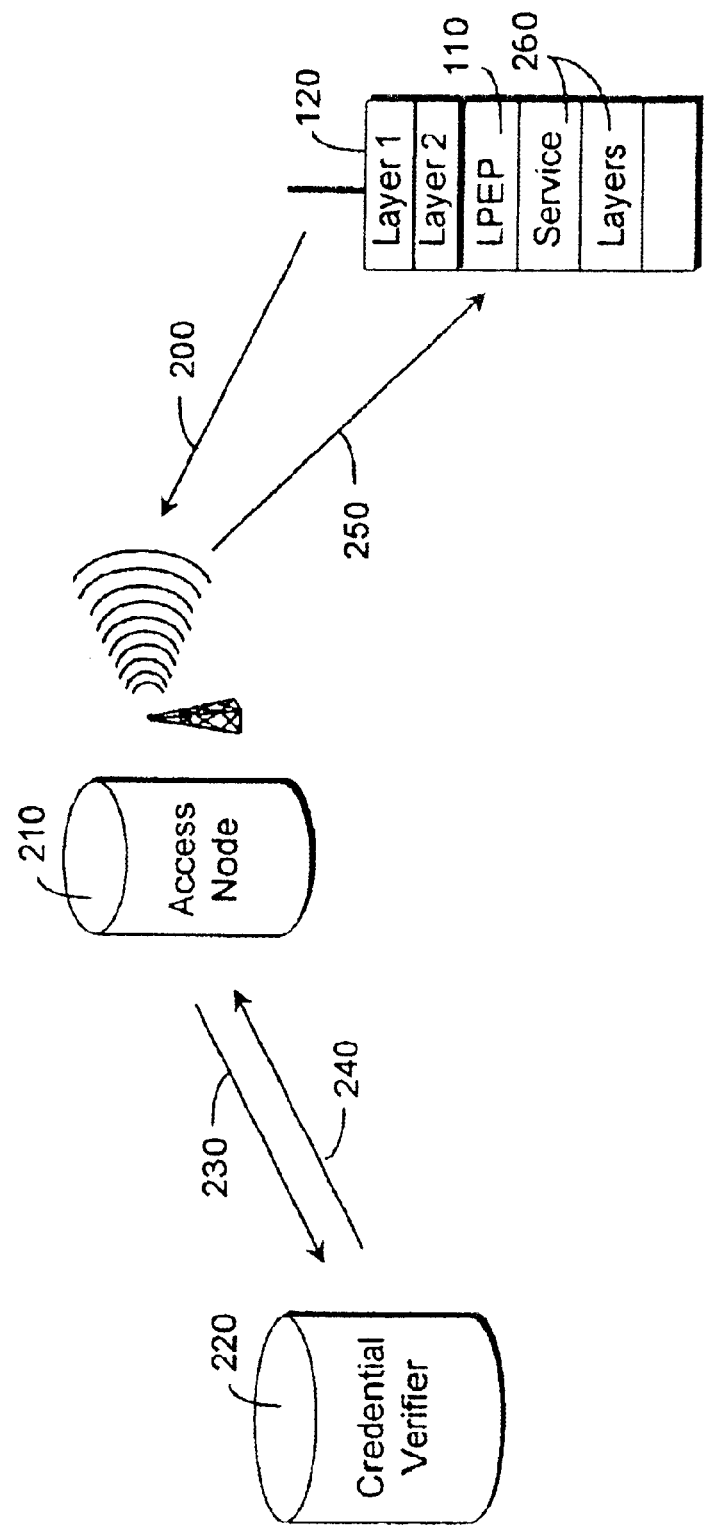
FIG. 2 shows an embodiment of an anonymous payment method in accordance with the present invention.

In FIG. 2 is an exemplifying embodiment of an anonymous payment method shown. The terminal 120 transmits a random access channel (in GSM typically the RACCH) including payment information 200 to an access node 210. The payment information identifies the Credential Verifier (CV) 220 e.g. the issuer of a credit card or an access subscription, the identity of the subscriber in an encrypted form and the credit verification in an encrypted form, e.g. a credit card number. This information is received in the access node 210 which reads out the address to the CV 220 adds a transaction number to the user identity and credit verification and transmits that information 230 to the identified CV 220 e.g. a MasterCard™ server. The CV 220 decrypts the packets sent from the access node 210 with unique keys for that particular subscriber and checks whether the user identity and the credit verification number are correct. In this way the subscriber can be uniquely identified and thus authenticated. If the relationship between the user identity and the credit verification is correct the CV 220 transmits a message with the same transaction number and a positive acknowledgement 240 back to the access node 210. The access node then returns a message 250 to a modem/router interface contained in the terminal 120 containing an IP-address and a positive acknowledgement, granting access. The IP-address is stored in the modem/router interface and in the LPEP 110 and is associated with a service requested by the subscriber in the service layers 260.

Figure 3:
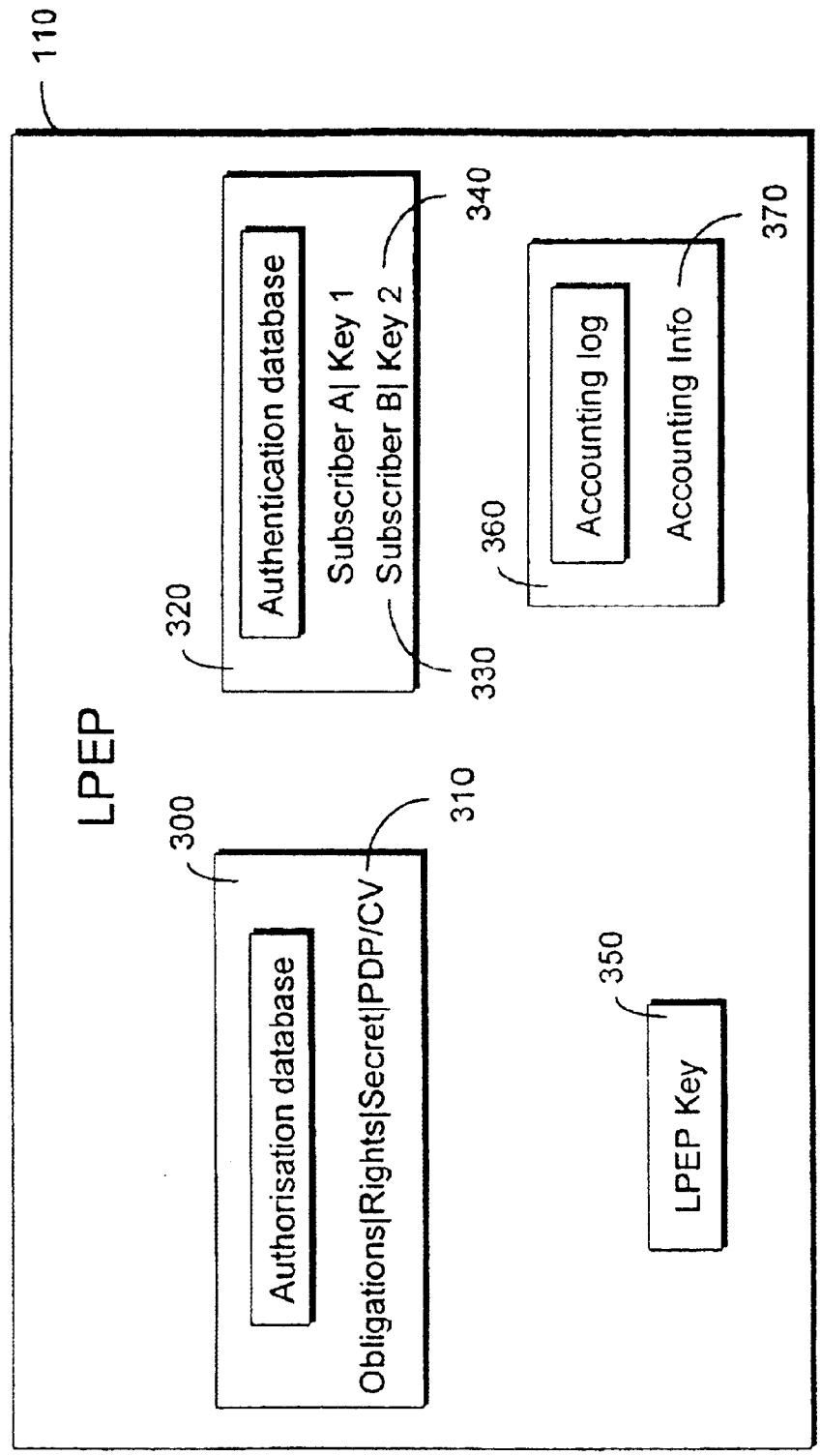
FIG. 3 shows a detailed view of an embodiment of a local policy enforcement point in accordance with the present invention.

The structure and operation of an exemplary embodiment of the LPEP 110 resident in the client or terminal 120 will now be described in more detail with reference to FIG. 3 of the drawings. As discussed above, the LPEP 110 enforces policies with respect to authentication of subscribers, authorization to access and services, accounting, mobility and security for the subscriber(s) that the LPEP 110 serves. These policies are defined in the SMP 100 that acts as a PDP for the LPEP 110. Each LPEP 110 has a set of policies associated with it and the relationship between the PDP and the LPEP 110 i.e. between the SMP 100 and the subscriber is uniquely defined by these policies in the LPEP authorization database 300.

Each relation that the subscriber has with SMP's 100 or CV's 220 is defined with a number of parameters 310. In the embodiment shown at least four parameters have been defined. These are obligations, rights, and a shared secret, i.e. a unique identity and an encryption key, and an IP-address to the SMP 100 or the CV 220. These relations are negotiated either in real time using public key infrastructure or by signing up for a service and receiving the obligations, rights, shared secret and IP-address 310 to the SMP 100 or CV 220 by mail, for example.

The LPEP 110 is also responsible for authenticating the subscriber via e.g. a PiN-code or a fingerprint reader. If the subscriber is authorised he gains access to the LPEP 110. It is possible that the LPEP 110 serves more than one subscriber, then the authentication database 320 stores several subscribers A, B, . . . 330 and their corresponding identification keys key 1, key 2, . . . 340. The LPEP key 350 on the other hand is used for identifying the LPEP 110 to the SMP 100 and for encrypting the traffic between the LPEP 110 and the SMP 100 or CV 220.

During a communication session the LPEP 110 maintains an accounting log 360 containing accounting information 310 pertaining to the session, such as start time, stop time and service utilised. This accounting log 360 can be used by the SMP 100 for billing and auditing purposes. At completion of the session the LPEP 110 can forward the accounting log 360 to the SMP 100 and the SMP 100 replies in agreement or disagreement, i.e. compare the accounting log in the SMP 100 with the one generated in the LPEP 110. Alternatively the accounting log 360 is transmitted from the LPEP 110 to the SMP 100 at regular intervals, such as at the end of the day.

Figure 4:
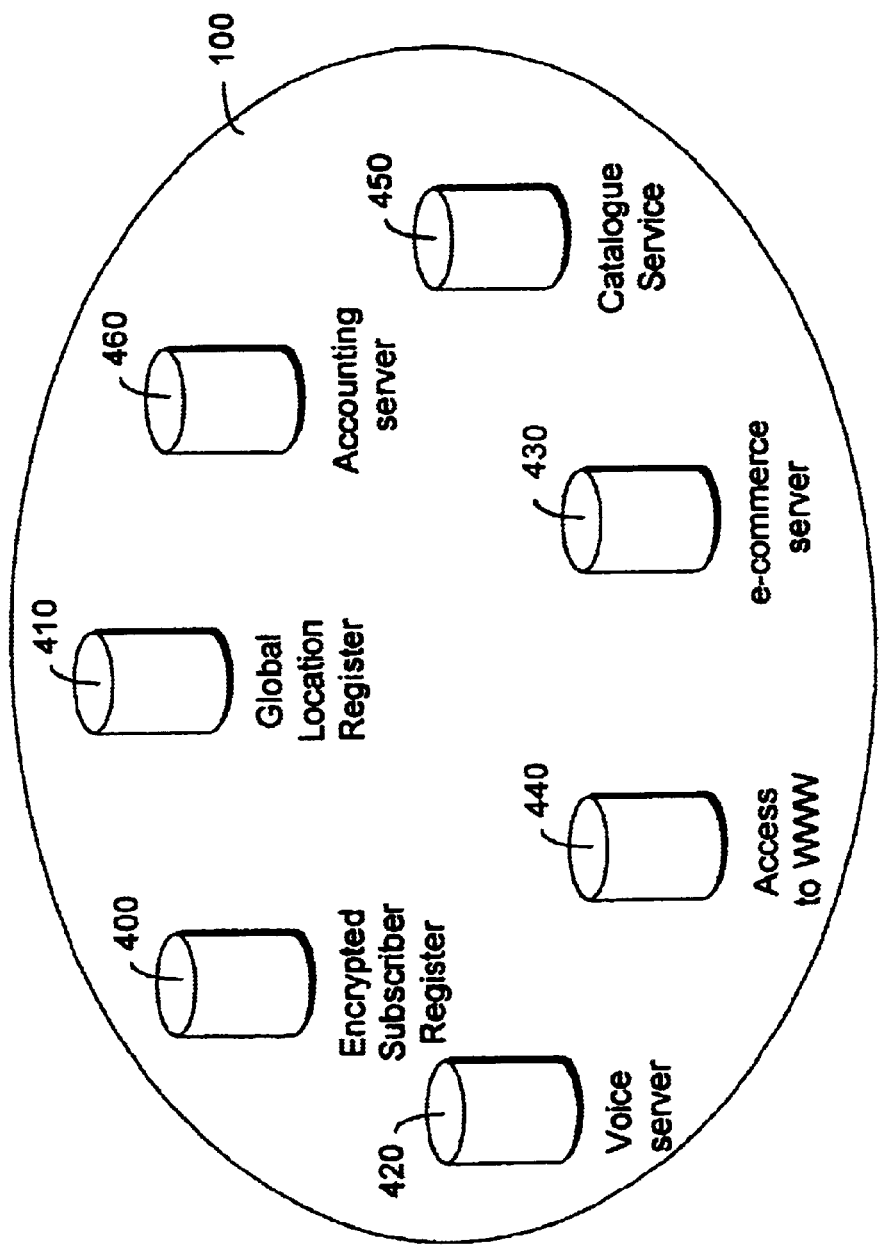
FIG. 4 shows a detailed view of an embodiment of a secure mobile portal in accordance with the present invention.

With reference now to FIG. 4 of the drawings, the structure and operation of an exemplary embodiment of the SMP 100 will be described in more detail. As discussed above, the SMP 100 defines policies with respect to authentication of subscribers, authorization to access and services, accounting, mobility and security for the subscribers that the SMP 100 serves. Thus, the SMP 100 contains an Encrypted Subscriber Register (ESR) 400 carrying subscriber IP addresses or network address identifiers (NAI), e.g. n.n@telia.mob, as well as encryption keys for each individual subscriber and service that the SMP 100 serves. This, to provide encryption, authentication and authorization to the services provided. The SMP 100 also contains a Global Location Register (GLR) 410 indicating which access networks the subscriber presently is residing (visiting) in. To be able to provide voice services the SMP 100 also contain a voice server 420 for providing e.g. voice over IP. The SMP 100 can be seen as a server cluster providing both secure and non-secure services to the subscriber; secure services like e-commerce 430, security alarms, health care services, etc. and non-secure services like web browsing 440 and catalogue/information services 450, for example. The SMP 100 also contains a secure accounting server 460 for accounting and auditing of records. The SMP 100 can also update the policies in the LPEP 110. For example if the subscriber does not pay the invoices for a particular service, that service can be barred.

Figure 5:
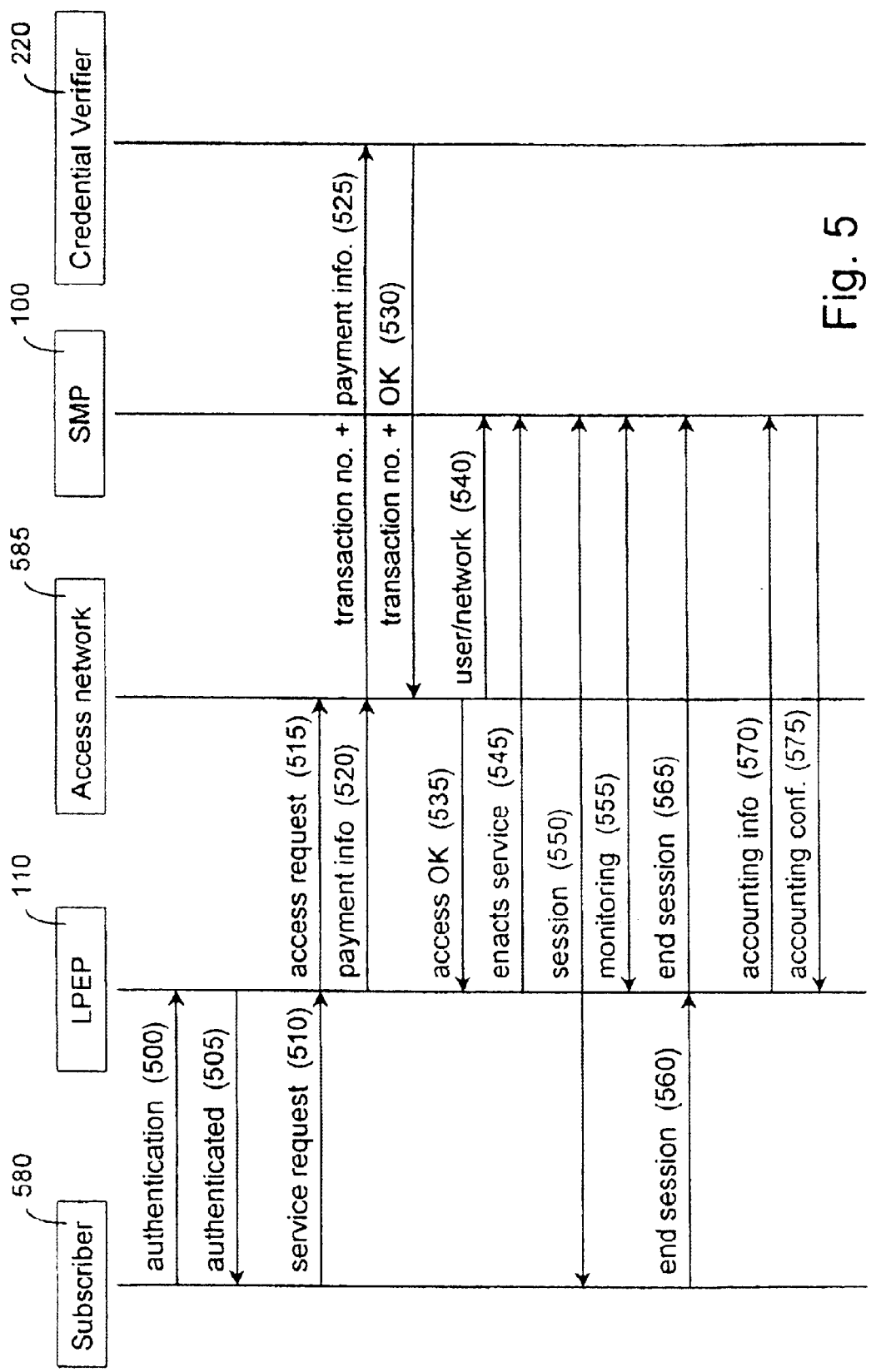
FIG. 5 is an exemplary signalling diagram illustrating the signalling involved in a session set up in accordance with the present invention.

With reference now to the exemplary signalling diagram shown in FIG. 5 of the drawings, the initiation of a session will be described in more detail. To initiate a session a subscriber 580 transmits an authentication request 500 including subscriber identity and a corresponding key e.g. a personal identification number (PIN) or a fingerprint, to gain access to the terminal and the rights of the LPEP 110. When the subscriber 580 receives an authentication reply 505 indicating that the subscriber 580 is authenticated to use the terminal, a service request 510 is transmitted to the LPEP 110. The LPEP 110 decides on a suitable access depending on the service requested by the subscriber and transmits an access request 515 identifying the subscriber and corresponding payment information 520, everything but the address to the CV encrypted by the LPEP key, to the chosen access network 585. The access network 585 reads the payment information and identifies the address to the Credential Verifier (CV) 220, generates a transaction number and adds the payment information, i.e. the user identity in an encrypted form and credit verification in an encrypted form, e.g. a credit card number, and transmits the message 525 to the CV 220. The CV 220 decrypts the message and if the relationship between the user identity and the credit verification is correct the CV transmits a message with the same transaction number and verifies the subscriber's credentials 530. The access network 585 transmits access OK 535 together with an IP-address to the LPEP 110 and at the same time the access network 585 transmits a message 540 to the SMP 100 indicating in what network the subscriber 580 is residing in. The LPEP 110 then enacts 545 the requested service 510 in the SMP 100 and the subscriber 580 and the SMP conducts a session 550. The LPEP 110 and the SMP 100 monitors 555 all transactions between the LPEP 110 and the SMP 100 for accounting purposes. To end the session the subscriber 580 transmits an end session message 560 to the LPEP 110 that transmits an end session message 565 to the SMP 100. When the session has ended the LPEP 110 sends accounting information 570 to the SMP 100 that compares it with the accounting information generated in the SMP 100 and sends a positive or negative accounting confirmation 575 back to the LPEP 110.

Figure 6:
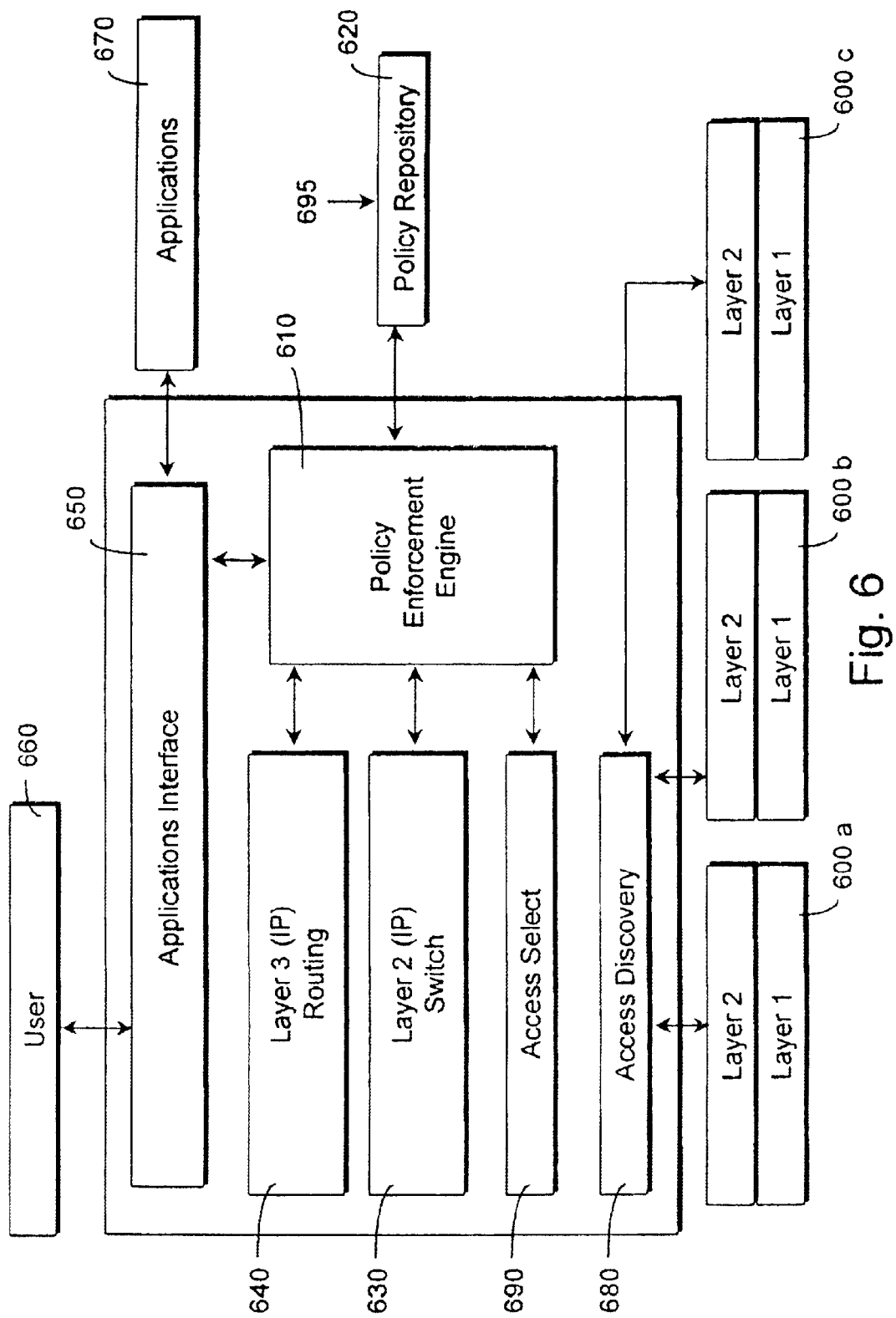
FIG. 6 is a detailed view of an exemplary embodiment of the terminal in accordance with the present invention.

With reference now to FIG. 6, embodiments and functions of the client or terminal will be described in more detail. The terminal is basically separated into three parts, an access part, a control part and a service part. The access part contains a number of access options (modems) 600a–c. These access options can physically be located in the terminal itself or in someone else's terminal, or be a Bluetooth™ interface connecting to remote modems e.g. in the subscriber's briefcase. The service part contains a user interface and applicable application programming interfaces (API's) for the services. The control part contains a policy enforcement engine 610 and a policy repository 620.

The terminal also contains a layer 2 IP switch 630 and a layer 3 IP router 640 between the modems 600a–c and the applications interface 650. This enables the user 660 the possibility to have several information flows between applications 670 and modems 600a–c active at the same time. For example can a voice over IP data flow be maintained through a W-CDMA network, at the same time as a multimedia flow is maintained through a W-LAN network, while the terminal at the same time is receiving a best effort flow from another terminal, through a Bluetooth™ modem. This possibility to route a plurality of data flows from a plurality of modems 600a–c is possible because of the included layer 2 IP switch 630, and layer 3 IP routing 640. This embodiment also makes it possible for the terminal to hand over a communication session from one communications network to another, by re-routing the data flow from one modem port to another.

The access discovery function 680 of the terminal is continuously active, scanning the surroundings for access possibilities and generates a record of all available access possibilities. The access selection function 690 is responsible for requesting access and presenting credentials to the desired access network depending on the service requested from the service layers and also for preparing to interconnect with the chosen access network.

The policy enforcement engine 610 and the policy repository 620 in the control part connect the modems 600a–c in the access part with the user 660 and the API's in the service part. More specifically the policy enforcement engine 610 in the control part has the responsibility for a variety of tasks such as authenticating the user 660 to the terminal, authorising the user 560 to services and collecting accounting data. These and other tasks will be further described in relation to FIG. 8.

The policy repository 620 of the terminal can be seen as a database containing the subscribers relationship to access providers, service providers as well as individual clients, i.e. the obligations, rights, shared secrets and addresses to credential verifiers or SMP's. These relationships can be varying and sometimes extremely complex. Also these relationships may need to be updated at any time.

Some service providers may e.g. have a hierarchical relation between different aspects of its service. For example a special access network or a special gateway might need to be used or passed before a particular service can be executed and perhaps a trusted relationship will have to be enacted for a particular session. Other service provider might be non-hierarchical, which means that the different services are open and enacted at the same level, e.g. in that any access network may be used.

A subscriber may have a relationship to many different structures, hierarchical and flat. For example, subscriber A has a private subscription with provider X for voice and web browsing. Under the voice service, subscriber A communicates following a specific policy with subscriber B. Subscriber A also has a specific business relationship to subscriber C. such that all packets to subscriber C will be encrypted and directly transferred to subscriber C. In addition to his private subscription with provider X and his occupational relationship with subscriber C, subscriber A may also be a member of an exclusive business club that operates a club server. His club membership fee provides subscriber A encrypted voice and data traffic services to all other members of the business club. The bank at which subscriber A has an account, may also operate a server of their own, and may have deployed a policy in the terminal of subscriber A, such that he always can access his bank account, even at midnights. Both the bank and the business club need to purchase the service of some MSP, in order to know the whereabouts of subscriber A, that is unless the bank or business club operates an MSP themselves. All these relationships are reflected in the policy repository 620.

Each relationship a user 660 or subscriber would like to enter into is defined using a number of at least three or four parameters. These are rights, obligations, shared secret, and address to a credential verifier or SMP, thus creating a policy block. The policy repository 620 contains several policy blocks defining the relationships that exists between the user 660 and different service providers as well as individuals.

The policy repository 620 can be accessed from outside 695 of the terminal providing the user has opened the policy repository 620 by e.g. a personal identification code, a fingerprint reading or other means. Then a service provider can update their policy block and relevant coupling coefficients. Once the service provider has entered its policies into the policy repository 620 these can be updated at will by the service provider providing such an agreement exists. If no such agreement exists the subscriber must open the policy repository 620 every time before changes can be made.

The policy enforcement engine 610 thus enforces policies defined in policy repositories 620. This implies e.g. that rental cars, hotel rooms etc. can be provided with policy enforcement engines 610 executing the policies in a user's or visitor's policy repository 620. Both the policy enforcement engine 610 and the policy repository 620 is preferably implemented as computer programs on a suitable media, e.g. smart cards together with a suitable wireless access product such as Bluetooth™. Other implementations are of course possible, e.g. integrated circuits, a circuit board in the terminal or as a separate circuit board that can be inserted into any appropriate terminal.

Figure 7:
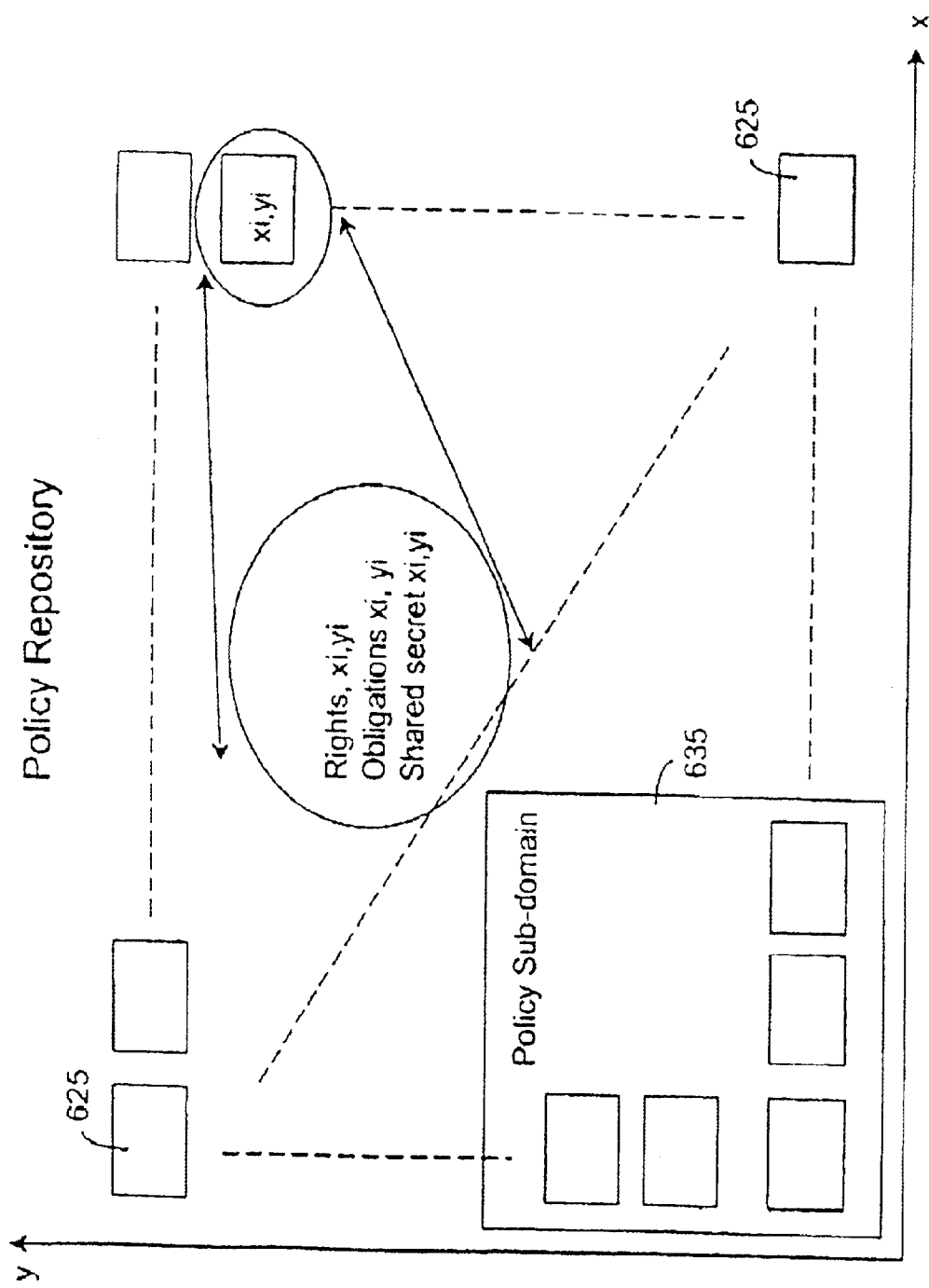
FIG. 7 shows schematically a Policy Domain (PD) in accordance with the present invention.

FIG. 7 shows a so-called Policy Domain (PD) and sub-domain. The policy domain contains multiple policy blocks 625 which contain all the specific relationships existing between the user and service providers, as well as individuals. Each policy domain may contain sub-domains 635 defining a reserved domain space for a particular application.

A coupling matrix is defined between the policy blocks, defining their hierarchical relationship. Relationships between policy blocks xi, yj and policy blocks xk, y] are determined by a coupling coefficient K, ij, k]. If the coupling coefficient is 0, than there is no relationship. If the coupling coefficient is +1, than block k,] is dependent on block i,j implying that block i,j has a higher position in the hierarchy than block k,] and that block i,j must be enacted before block k,].

If the coupling coefficient is −1, than block k,] supersedes block i,j, implying that block i,j has a lower position in the hierarchy than block k,].

Figure 8:
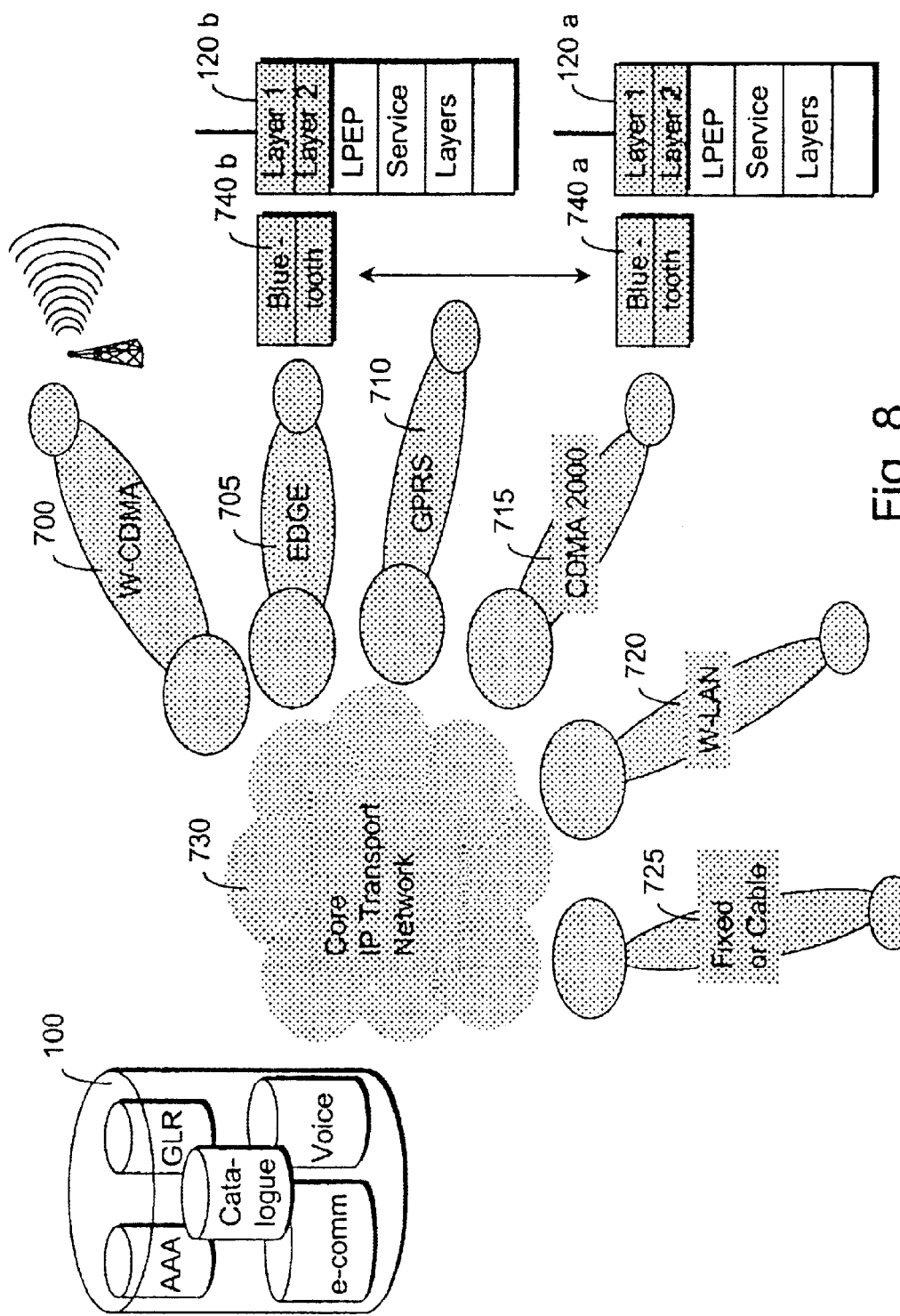
FIG. 8 shows a mixed access scenario in accordance with the present invention.

With reference now to both FIGS. 6 and 8 the tasks of the control part of the terminal will be described in more detail together with a mixed access scenario. Suppose that the access possibilities consists of several different networks, such as W-COMA 700, EDGE 705, GPRS 710, CDMA-2000 715, W-LAN 720 or Fixed or Cable 725 and that the transport network is an IP based core network 730. To gain access to the functions of the terminal and the policy enforcement engine 610 and policy repository 620 the user 660 must be authenticated. Thus an authentication request is Transmitted to the policy enforcement engine 610 that checks the authentication with the relevant policy blocks in the policy repository 620. When the user 660 is authenticated all the rights and obligations associated with the user in the policy repository 620 are open.

The access discovery function 680, which is continuously active, has scanner all available access networks and found the above mentioned access possibilities 700–725 and made a record of what is available. The user 660 now e.g. wants to initiate a web-service and thus via the applications interface 650 agree on parameters, i.e. some Quality of Service value for the session. e.g. the transmission rate. The applications interface 650 thereafter asks the policy enforcement engine 610 to enact the requested web-service. The policy enforcement engine 610 then collects data from the policy repository 620 and the access selection function 690 to set up a channel that complies with the agreed parameters and the requested service and thereafter activates the connection.

If the user 660 does not have a subscription to the requested network, the policy enforcement engine 610 presents credentials to the appropriate access supplier. The credentials can e.g. be a credit card accepted by the access supplier. The policy enforcement engine 610 then launches the requested web-service according to the policies in the policy repository 620. The policy enforcement engine 610 tracks data exchanged during the executed web-service according to policies for accounting and verification purposes. Then the policy enforcement engine 610 disconnects the application 670 and assembles the accounting data.

Another possibility occurs if the terminal does not have the appropriate modem 600a–c for the best access network. Imagine for example that the GPRS network 710 is most suitable for the requested web-service but the user terminal only has a W-CDMA interface. The solution is the Bluetooth™ modem 740a–b attached to the terminal, which makes it possible to use the modems 500a–c of a neighbouring terminal. The Bluetooth™ modem, 740a–b in the neighbouring terminal then acts as an access point or bridge to access the GPRS modem of the other terminal.

The user or subscriber physical owns the PEP. The content of the PEP can be the ownership of many parties. The subscriber controls access to the PEP., and can delegate these rights to another party, for example an operator, or other service provider The PO and its sub-domains can be accessed from outside, providing the user initially opens the PD (by a card opening PIN or by other means). The service provider can enter its policy blocks, as well as the relevant coupling factors that define the relationship between the policies of the service operator. Once the service provider has entered its policies into the PEP, these can be updated at will by the service provider, providing such an agreement exists. If there is no such agreement, then the PD must be opened each tire by default, for example.

The LPEP can be realized physically in many different ways. It can be on board in a mobile terminal, it can be part of a network termination equipment in the residence, it can be a separate board which can be inserted into any appropriate terminal when the user wishes to make a call, or it can be a separate PEP board encapsulated together with a suitable wireless access product (such as Bluetooth™). The PEP may communicate with the client that the subscriber wishes to use for communication according to the principles defined above.

The invention being thus described, it will be obvious that the same may be varied in many ways. Such variations are not to be regarded as a departure from the scope of the invention, and all such modifications as would be appreciated by a person skilled in art are intended to be included within the scope of the following claims.

What is claimed is:

1. A communications system comprising:

at least one communications server associated with at least one communications network;

at least one communications terminal connected to the communications network to form a client-server relationship with the at least one communications server;

at least one policy definition point associated with said at least one communications server, said policy definition point defining policies for services, authentication, authorization, and accounting; and at least one policy enforcement point associated with said at least one communications terminal, wherein said policy enforcement point is operable to enforce on said communications terminal the policies defined in said policy definition point.

2. The communications system according to claim 1, wherein said client-server relationship is provided by a transparent packet pipe transporting and classifying packets according to Quality of Service.

3. The communications system according to claim 1, wherein said policy enforcement point includes means for enforcing policies pertaining to services, authentication, authorization and accounting.

4. The communications system according to claim 1, wherein said policy enforcement point resides in said at least one communications terminal as a local policy enforcement point.

5. The communications system according to claim 1, wherein said at least one communications terminal is operable to support several simultaneously ongoing independent client-server relationships.

6. The communications system according to claim 1, further comprising at least two mutually heterogeneous communication networks, wherein said at least one communications terminal is operable to exchange information with said at least two mutually heterogeneous communication networks.

7. The communications system according to claim 1, wherein said policy definition point is associated with at least one cluster of said at least one communications server.

8. The communications system according to claim 7, wherein said policy definition point includes means for enacting policies in said at least one cluster of servers.

9. The communications system according to claim 1, wherein said policy enforcement point includes means for enforcing a plurality of policies emanating from a plurality of networks and service providers.

10. The communications system according to claim 1, further comprising a credential verifier providing means for anonymous payment of access for at least one of said at least one communications network.

11. The communications system according to claim 1, wherein said policy definition point further includes a subscriber database including means for storing subscriber IP addresses and encryption keys for each of a plurality of subscribers.

12. The communications system according to claim 1, wherein said policy definition point includes a global location register indicating in which of said at least one communications network said at least one communications terminal resides.

13. A method for global roaming in a communications system, said method comprising the steps of:

forming a client-server relationship between at least one communications terminal and at least one communications server associated with at least one communications network;

defining policies pertaining to services authentication, authorization, and accounting in a policy definition point within said communications network; and enforcing the defined policies at a policy enforcement point associated with the communications terminal.

14. The method of claim 13, further comprising the step of storing in said policy definition point subscriber IP addresses and encryption keys for each of a plurality of subscribers.

15. The method of claim 13, further comprising the step of providing said client-server relationship by transporting and classifying packets according to Quality of Service.

16. The method of claim 13, further comprising the step of providing separate charging mechanisms for access and services for client-server based transactions.

17. The method of claim 13, further comprising the step of defining a policy domain having multiple policy blocks, each containing a specific relationship between a client and said at least one communications server.

18. The method of claim 13, further comprising the steps of:

entering said policies in said policy enforcement point by a service provider; and updating said policies.

19. The method of claim 13, further comprising the step of defining, by said policy definition point, said policies in a plurality of server clusters.

* * * * *

UNITED STATES PATENT AND TRADEMARK OFFICE
CERTIFICATE OF CORRECTION

PATENT NO.       : 6,880,009 B2
APPLICATION NO.  : 09/760569
DATED            : April 12, 2005
INVENTOR(S)      : Phillippe Charas It is certified that error appears in the above-identified patent and that said Letters Patent is hereby corrected as shown below:

On the Title Page, Field (75), under "Inventor", in Column 1, Line 1, delete "Phillippe" and insert -- Philippe --, therefor.

In Column 1, Line 9, delete "roaring" and insert -- roaming --, therefor.

In Column 1, Line 15, delete "(W-COMA)" and insert -- (W-CDMA) --, therefor.

In Column 2, Line 5, delete "sot" and insert -- set --, therefor.

In Column 5, Line 46, delete "310" and insert -- 370 --, therefor.

In Column 7, Line 32, delete "560" and insert -- 660 --, therefor.

In Column 8, Line 57, delete "W-COMA" and insert -- W-CDMA --, therefor.

In Column 9, Line 2, delete "scanner" and insert -- scanned --, therefor.

In Column 9, Line 34, delete "500a-c" and insert -- 600a-c --, therefor.

In Column 9, Line 42, delete "PO" and insert -- PD --, therefor.

In Column 9, Line 51, delete "tire" and insert -- time --, therefore.

Signed and Sealed this

Sixth Day of November, 2007

JON W. DUDAS
*Director of the United States Patent and Trademark Office*